June 17, 1958            J. ARNI            2,838,945
DEVICES DRIVEN BY A SHAFT AT A VARIABLE SPEED
AND ADAPTED TO SUPPLY IMPULSES
UNIFORMLY SPACED IN TIME
Filed July 26, 1957            2 Sheets-Sheet 1

INVENTOR
JOHANN ARNI

June 17, 1958     J. ARNI     2,838,945
DEVICES DRIVEN BY A SHAFT AT A VARIABLE SPEED
AND ADAPTED TO SUPPLY IMPULSES
UNIFORMLY SPACED IN TIME
Filed July 26, 1957     2 Sheets-Sheet 2
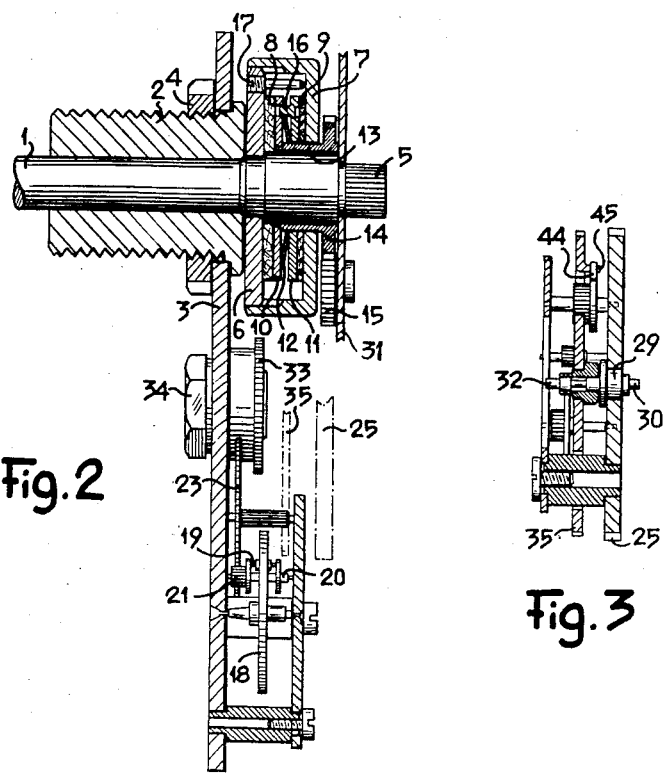
Fig.2
Fig.3
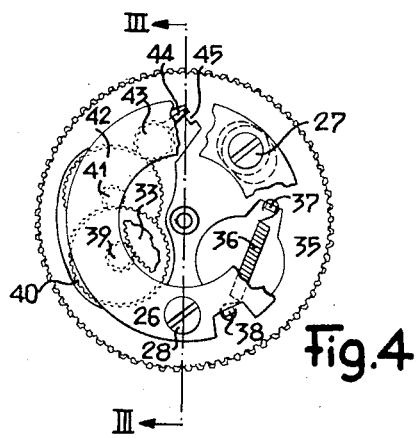
Fig.4
INVENTOR
JOHANN ARNI

United States Patent Office 2,838,945
Patented June 17, 1958

2,838,945

DEVICES DRIVEN BY A SHAFT AT A VARIABLE SPEED AND ADAPTED TO SUPPLY IMPULSES UNIFORMLY SPACED IN TIME

Johann Arni, Geneva, Switzerland, assignor to Anstalt Merces, Vaduz, Liechtenstein, a corporation of Liechtenstein Application July 26, 1957, Serial No. 674,512

Claims priority, application Switzerland, January 31, 1957

6 Claims. (Cl. 74—111)

Devices are already known driven by variable speed shafts and adapted to supply impulses uniformly spaced in time, comprising a sliding transmission device, located between the variable speed shaft and a rotary member of which the speed of rotation is controlled by an escapement device, said rotary member co-operating with at least one movable element for moving it by uniform impulses.

It is difficult to obtain good precision in the operation of said devices, as the period of oscillation of the escapement devices varies in proportion to the load applied thereto and, in practice, it is not possible to obviate variations in the resistance forces which oppose the movements of the movable element which is moved by regular impulses. In fact, said movable element is frequently adapted to mark time marks, for example on paper by means of an inking point, or even on a metal sheet or otherwise coated with a layer of wax or tinted grease, the movable element, in this case, being adapted to remove the wax or tinted grease so that the time marks are visible. It will be clear that the resistance due to friction of the part serving to trace the time marks may depend on a number of factors, such as, for example, the quality of the paper, the hygrometric degree of the atmosphere and of the temperature, as the latter has an influence on the viscosity of the ink or of the oil, or even on the resistance of the wax.

The present invention has for its object to remedy this inconvenience. It has for its subject a device of the type referred to, wherein the rotary member drives, through the medium of a resilient element, a rotary part of which the speed of rotation is limited by the escapement device, a locking mechanism of the rotary member being controlled by the rotary part driven in such a manner as to lock it and release it periodically and enable it to turn through a determined angle at each unlocking, said mechanism ensuring the unlocking each time the driven part has effected a rotation through a determined angle and the locking each time the rotary member has turned through a predetermined angle.

One form of construction of the device according to the invention, provided particularly for being applied to a speedometer, is shown diagrammatically and by way of example in the accompanying drawings, wherein:

Fig. 2 is a section on the line II—II of Fig. 1, a portion being omitted and shown in Figs. 3 and 4.

Fig. 3 is a section on the line III—III of Fig. 4.

Fig. 4 is a side view, partly broken away, of the part shown in Fig. 3.

Figure 1:
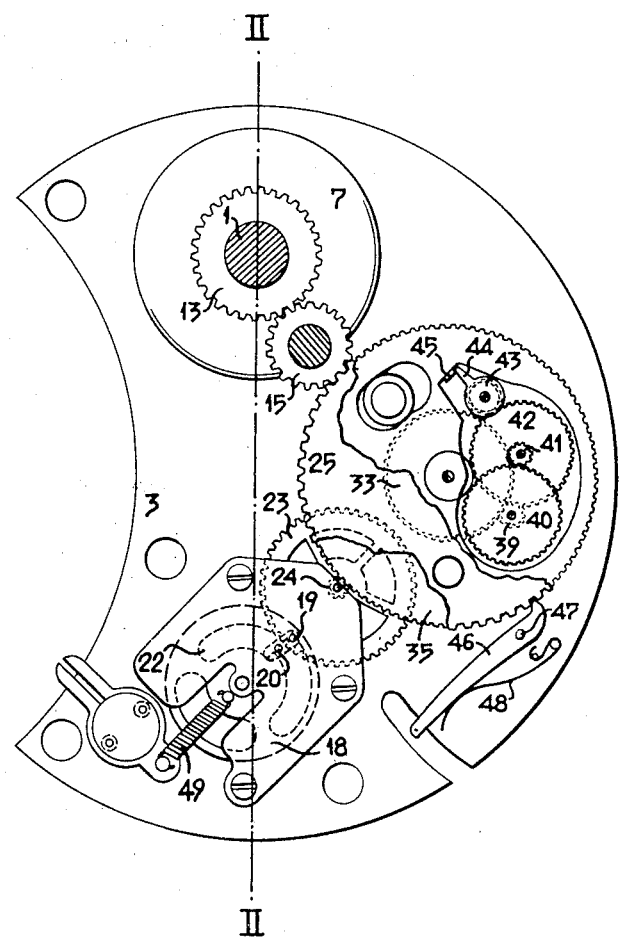
Fig. 1 is a side view of this form of construction, partly broken away.

The device shown is provided for being incorporated in a speedometer, of the type in which the time marks are drawn on a disc which is driven at a speed proportional to that of the vehicle which is provided with the instrument. However, a part of this speedometer has no connection with the invention and is therefore not shown so as not to overload the drawing unnecessarily.

The device comprises a shaft 1 which is driven in proportion to the speed of the vehicle. Said shaft turns in a sleeve 2 (Fig. 2) which is secured to a plate 3 by means of a nut 4 screwed on the sleeve. The shaft 1 carries a pinion 5 at one of its ends, said pinion being adapted for driving a disc not shown, on which are drawn time marks permitting of determining the speed of the vehicle on the last part of the travel which it has effected. Said shaft is secured to a flange 6 forming one of the faces of a cylindrical casing formed by said flange 6 and a part 7 in the form of a clock. The flange 6 is provided with a screw thread on its periphery, which enables it to be secured in a corresponding screw thread provided in the interior of the cylindrical face of the part. In the interior of said casing are located two friction linings 8 and 9 in the form of washers and capable of turning in the interior of the cylindrical casing. Said casing also contains two smooth washers 10 and 11 which are held spaced apart by a resilient washer 12, in such a manner that each of the linings 8 and 9 is clamped between one of the washers 10 or 11 respectively and one of the plane faces of the cylindrical casing. The washer 10 is secured to the end of a sleeve 13 fitted on the shaft 1 and capable of turning on this. The end of said sleeve 13 forms a toothed wheel 14 which gears with a pinion 15 for ensuring the driving of the device for marking the time. As will be seen in Fig. 2, the washer 10 has a notch near its upper portion, with which notch engages a projecting part 16 of the washer 11, in such a manner as to render the two washers 10 and 11 solid in rotation one with the other. A screw 17 is screwed into the flange 6, in such a manner as to abut against the part 7 and to prevent any angular movement between said latter and the flange 6 when the latter has been placed in position. When screwing the flange 6 into the part 7, strong compression is applied to the resilient washer 12, which enables the pressure applied to the linings 8 and 9 to be adjusted and, consequently the value of the maximum couple which may be transmitted by the shaft 1 to the sleeve 13 by the friction between the cylindrical casing, the linings 8 and 9 and the washers 10 and 11.

The plate 3 also carries an escapement device comprising a balance wheel 18 subjected to the action of a traction spring 49, and co-operating with a driving finger 19 which is secured eccentrically to a spindle 20 carrying a pinion 21. Said finger 19 co-operates with a slot 22 of the balance wheel 18, which slot has two shoulders against which the finger 19 abuts alternately each time it has completed a rotation of half a revolution. Said escapement device is not described in detail here, as it is known and forms the subject of Swiss Patent No. 273,135.

The finger 19 is driven by means of the pinion 21 and a toothed wheel 23 secured to a pinion 24. Said latter is driven in rotation by the device which is shown in detail in Figs. 3 and 4.

Said latter device comprises a first wheel 25 which is driven by the pinion 15 and to which an annular part 26 is secured through the medium of two screws 27 and 28. The wheel 25 is provided with a spindle 29 of which one end 30 is adapted to be pivoted in a hole, not shown, of a second plate 31 (Fig. 2), through which also passes the pinion 5 at the end of the shaft 1. The other end 32 of the shaft 29 is adapted to pivot in a bore provided in the support of a toothed wheel 33 secured to the plate 3 by a nut 34. With reference to Fig. 3, a second toothed wheel 35 is mounted loosely on the spindle 29 and is co-axial to the wheel 25. In Fig. 2 are shown in chain-dotted lines, the positions occupied by the wheels 25 and 35 when the device shown in Fig. 3 is placed in position. The wheel 35 forms a rotary part of which the speed of rotation is limited by the escapement device, as this wheel 35 is in engagement with the pinion 24 of the escapement device. It is driven by the rotary member formed by the wheel 25, through the medium of a resilient element formed by a spring 36 (Fig. 4) which is secured, on the one hand, to a finger 37 secured to the wheel 35 and, on the other hand by a finger 38 of the annular part 26.

A locking mechanism for the rotary member, that is to say the wheel 25, is controlled by the driven rotary part, which is formed by the wheel 35, in such a manner as to lock and unlock the wheel 25 periodically and enable it to turn through a determined angle at each unlocking. Said mechanism ensures the unlocking each time the wheel 35 has made a rotation through a definite angle, and the locking each time the wheel 25 has turned through a determined angle. Said mechanism comprises a train of planetary gear 39 to 43 mounted on spindles pivoted between the first wheel 25 and the annular part 26 which is secured thereto. The first pinion 39 of the gear train gears with the stationary toothed wheel 33 when the device is mounted between the plates 3 and 31 and that it consequently occupies the position shown in Fig. 1. In Fig. 4 is shown the portion of the toothed wheel 33 which gears with the pinion 39. It should be mentioned that the wheel 35 has a number of recesses for the passage of supports for the screws 27 and 28 and toothed wheels of the planetary gear train, said recesses being sufficiently large so as to enable the wheel 35 to pivot relatively to the wheel 25 through an angle greater than that corresponding with the spacing of two adjacent teeth of the wheel 25.

The last pinion 43 of the planetary gear train entrains a finger 44 which extends radially relatively to the axis of rotation of said pinion. Said finger 44 is positioned in such a manner as to come into contact with a stop 45 of the second wheel 35, so as to lock the first wheel 25 and to release it only when the second wheel 35 has turned sufficiently so that the stop 45 is out of the path of the finger 44.

Finally the teeth of the first wheel 25 engage with a pin of the lever 46 which is hinged at 47 to the plate 3 and subjected to the action of a return spring 48. Said lever constitutes a movable element adapted to be moved by uniform impulses so as to produce the time marks on the disc, not shown, which is driven by the pinion 5 at the end of the shaft 1.

The operation of the device described is as follows:

When the device is at rest, the finger 44 is not in contact with the stop 44 of the second wheel 35, as the latter has turned relatively to the wheel 25, under the action of the spring 36. When the shaft 1 is driven in rotation, it produces, through the medium of the sliding transmission device and the pinion 15, the drive of the first wheel 25. When the vehicle has exceeded a relatively low minimum speed, for example 5 km./h., the wheel 25 is driven at a speed higher than that of the wheel 35, of which the speed is limited by the escapement device. There is then produced an angular movement between the wheels 25 and 35 whilst the spring 36 strains. During the rotation of the wheel 25, the finger 44 is also driven in rotation by means of a gear train 39 to 43 which is in engagement with the stationary toothed wheel 33. The ratio of these gears is determined in such a manner that the finger 44 effects a complete rotation relatively to the wheel 25 each time the latter has effected an angular movement corresponding with the spacing between two adjacent teeth of its periphery. By reason of the higher speed of rotation of the wheel 25 relatively to the wheel 35, an angular displacement is produced between these two wheels, which provokes the coming into contact of the finger 44 with the stop 45. The rotation of said finger is thus stopped, whereby there is produced at the same time the locking of the wheel 25, through the medium of the planetary gear train and the stationary wheel 33. During this period of time, the wheel 35, which is always subjected to the force of the spring 36, continues to rotate at a constant speed, causing the escapement device to function. When this wheel 35 has turned through a sufficient angle so that the stop 45 is outside the path of the finger 44, the latter can again turn, so that the wheel 25 is released. This latter immediately begins to turn under the action of the substantially constant couple which is applied by the sliding transmission device and it effects rapidly a rotation through an angle corresponding to the spacing between two of its teeth, whilst the finger 44 has made a complete rotation. During this movement, the wheel 25 has turned at a much higher speed than the wheel 35 which is braked by the escapement device, so that when the finger 44 has made a complete revolution, it again comes into contact with the stop 45 of the wheel 35. The wheel 25 is again locked until the wheel 35 has turned sufficiently for releasing the finger 44. The wheel 25 thus turns by regularly spaced impulses of such a value that the periphery of said wheel travels at each impulse the distance separating two adjacent teeth. Each time the wheel 25 effects a rotation, the lever 46 is subjected to an oscillation by reason of the action of a tooth of the wheel 25 on the pin of said lever.

The duration separating two successive oscillations of the lever 46 is considerably greater than the period of oscillation of the balance wheel 18. In practice, said balance wheel may be provided so as to effect ten oscillations per second, whilst the wheel 25 may be unlocked each time the balance wheel 18 has effected four oscillations, which gives a period of oscillation of 0.4 second to the lever 46.

The device described is very advantageous, as the couple applied by the wheel 35 on the escapement device is practically constant and independent of the energy which is to be applied to the lever 46 by the wheel 25. In fact, said couple is applied solely by the spring 36, and the friction which the end of the finger 44 can exert on the stop 45 which is secured to the wheel 35 is entirely negligible. Said device is very advantageous, as it is thus possible to apply to the first wheel 25 a couple which is much stronger than that which said wheel applies to the second wheel 35 through the medium of the spring. In practice, the couple applied to the wheel 25 is always at least twice as strong as that due to the spring 36. On the other hand, the sliding transmission device which has been described is of simple construction, as it only comprises rotary parts and, further, all the parts partaking in friction are enclosed in a cylindrical casing formed by the flange 6 and the part 7. It thus results that these parts are protected from dust and thus operate under the best possible conditions, so that the couple transmitted to the pinion 15 practically does not vary in the course of time, and even after a long period of operation.

I claim:

1. A device driven by a variable speed shaft and adapted to supply impulses uniformly spaced in time, comprising a slipping transmission device, located between said variable speed shaft and a rotary member of which the speed of rotation is controlled by an escapement device, said rotary member co-operating with at least one movable element for moving it by uniform impulses, said rotary member driving, through the medium of a resilient element, a rotary part of which the speed of rotation is limited by said escapement device, a locking mechanism for said rotary member, said locking mechanism being controlled by said rotary part driven in such a manner as to lock it and release it periodically and enable it to turn through a determined angle at each unlocking, said locking mechanism ensuring the unlocking each time said driven part has effected a rotation through a determined angle, and the locking each time the rotary member has turned through a predetermined angle.

2. A device according to claim 1, wherein said rotary member is constituted by a wheel connected to a second wheel which forms the rotary driven part, said two wheels being connected together by a spring allowing of the resilient driving of said second wheel by said first wheel, the locking mechanism being controlled by the differences in angular displacement between said two wheels in such a manner as to release said first wheel when the angular movement exceeds a predetermined value.

3. A device according to claim 2, wherein said locking mechanism comprises a train of planetary gears carried by said first wheel and gearing with a toothed stationary wheel and co-axial with said first wheel, the latter pinion of the planetary train driving a finger extending radially relatively to the axis of rotation of said latter pinion, said finger being placed in such a manner as to come into contact with a stop of said second wheel in such a manner as to lock said first wheel and not unlocking it until said second wheel has turned sufficiently so that said stop is out of the path of said finger.

4. A device according to claim 3, wherein said slipping transmission device exerts on said first wheel a couple at least twice as strong as that which said first wheel applies to said second wheel through the medium of said spring.

5. A device according to claim 1, wherein said slipping transmission device comprises a part in the form of a flattened cylindrical casing of which the axis coincides with that of said variable speed shaft, said casing containing two friction linings in the form of a washer and, between these two linings, two free washers, said two free washers being spaced one from the other by at least one resilient washer, the arrangement being such that each of said linings is clamped between one of said washers and one of the plane faces of said cylindrical casing, the transmission of the couple being obtained by the friction between said cylindrical casing and said washers.

6. A device according to claim 5, wherein said variable speed shaft passes from one side to the other of said cylindrical casing, said shaft being secured to a flange forming a face of said casing, said flange being secured to the remaining part of said casing by means of screwing, so as to permit of adjusting the pressure applied to said linings, said washers being secured in rotation one to the other, one of said washers being secured to a sleeve surrounding said variable speed shaft, said sleeve having a portion located outside said cylindrical casing and forming the driven shaft of said transmission device.

No references cited.